United States Patent [19]

Crowe

[11] Patent Number: 4,779,636

[45] Date of Patent: Oct. 25, 1988

[54] INSTALLING RESERVOIR TAPS

[76] Inventor: John W. Crowe, Rt. 2, Box 357A, Wagoner, Okla. 74467

[21] Appl. No.: 109,814

[22] Filed: Oct. 16, 1987

[51] Int. Cl.$^4$ .......................... B08B 9/02; B08B 5/04; F16K 43/00

[52] U.S. Cl. ........................................ 137/15; 134/21; 134/22.1; 134/166 C; 134/169 C; 137/238; 137/318; 137/319

[58] Field of Search .................. 134/21, 22.1, , 166 C, 134/167 C, 168 C, 169 C, 166 R; 137/15, 238, 315, 317, 318, 319, 320

[56] References Cited

U.S. PATENT DOCUMENTS

| Re. 27,895 | 1/1974 | Ray | 137/318 |
|---|---|---|---|
| 174,542 | 3/1876 | Letzkus | 137/318 |
| 314,085 | 3/1885 | Van Norman | 137/318 |
| 334,520 | 1/1886 | Dodge, Jr. | 137/318 |
| 2,353,530 | 7/1944 | Walker | 137/320 |
| 4,214,603 | 7/1980 | Hall et al. | 137/315 |
| 4,345,613 | 8/1982 | Mills et al. | 137/318 |
| 4,430,788 | 2/1984 | Haynes | 137/315 |
| 4,571,271 | 2/1986 | Dildine | 134/21 |

FOREIGN PATENT DOCUMENTS 19615 10/1904 Sweden .............................. 137/318

Primary Examiner—George L. Walton
Attorney, Agent, or Firm—Head & Johnson

[57] ABSTRACT

This process permits an inlet/outlet to be established in a liquid filled tank using an underwater diver without the necessity of draining or otherwise putting the tank out of service. The diver enters the tank at the top and places a dry pot against about the center of the back of the manhole cover. A hole is drilled in the manhole cover and a pipe nipple inserted through the hole. A flange is provided on the pipe nipple and if a gasket is not used, it is welded completely around to prevent leakage. A cap or valve is screwed onto the pipe nipple on the outside and the dry pot is removed. Various other ways of placing the pipe nipple through the wall are described. The installed nipple can be used by attaching a suction hose thereto for the purpose of removing sediments from the floor of the tank. If desired a smaller inlet/outlet installed in this manner is used to supply air for a diver working on the inside of the tank.

10 Claims, 3 Drawing Sheets

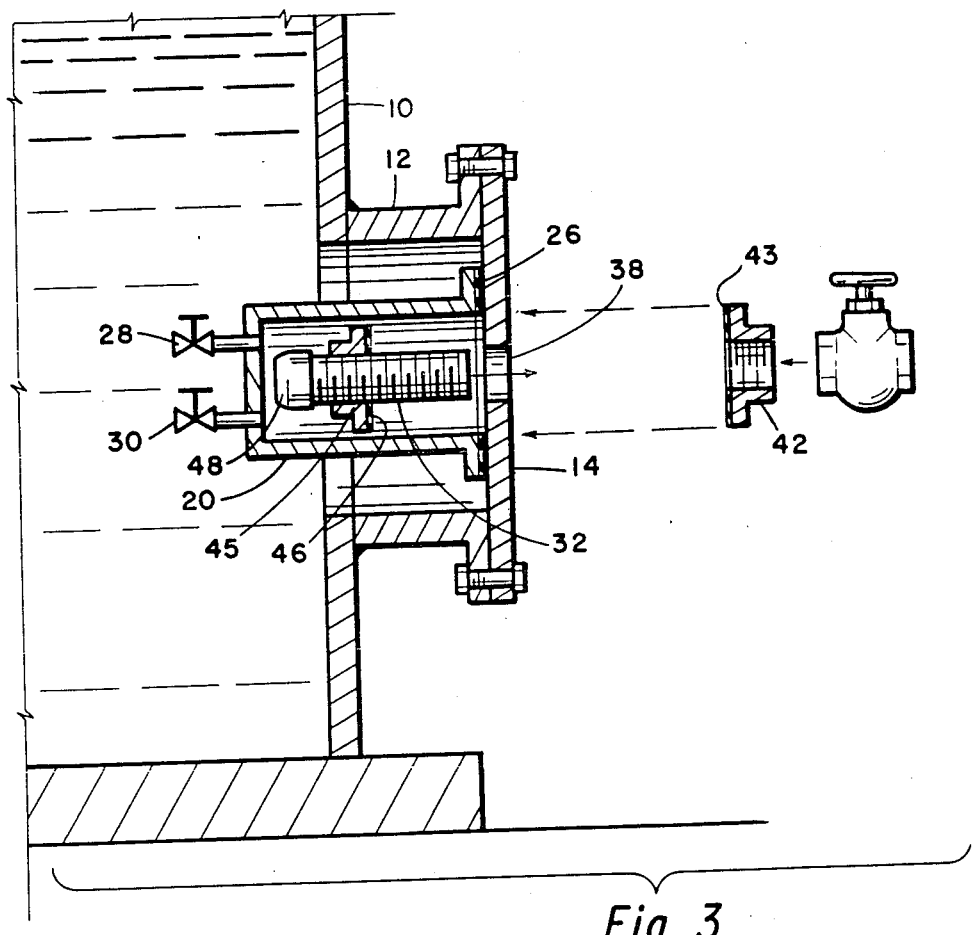
Fig. 3
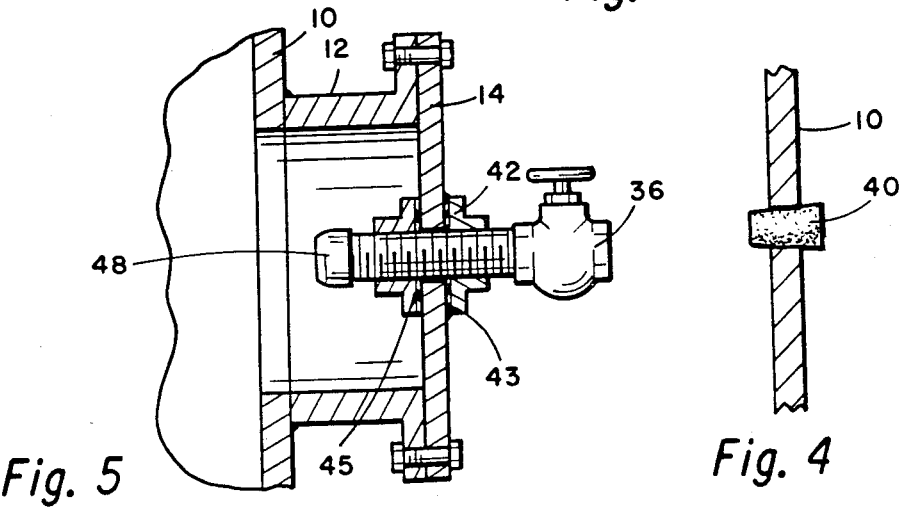
Fig. 5
Fig. 4

INSTALLING RESERVOIR TAPS

DISCLOSURE STATEMENT

A preliminary patentability search revealed the following U.S. Pat. Nos.: 3,821,964, 3,807,435, 4,282,894, 4,155,372, 3,396,745, 4,497,332, 3,782,407, 990,580.

None of these disclose the tapping into a water reservoir using a dry pot in which a diver performed operations from inside the vessel. All of these were revealed in the search and they set forth various ways of tapping into pressurized vessels such as tanks, pipelines, and so forth.

Another U.S. Pat. No. 4,571,271 to Dildine sets forth a method of removing sediments from a large storage container but does not disclose a tapping into a water reservoir using a dry pot in which a diver performs certain operations inside the vessel.

FIELD OF THE INVENTION

This invention relates to establishing an inlet/outlet in a wall of a liquid filled tank for use in the cleaning of the tank, such as in a water storage tank.

Clean water used for drinking is stored in tanks throughout all of the parts of this country and many parts of the world. The clean water, which is normally suitable for drinking, is pumped into the tank, then the water is withdrawn from the tank and pipelines are run to various homes, plants, factories and so forth.

For high water quality control it is necessary to perform periodic cleaning of the tank in which the clean water is stored. In the bottom of all storage tanks, sediments will accumulate covering the bottom. This is because the incoming water may carry its own sediment held in suspension which when sitting in the tank will precipitate. Some minerals, as well as the sediments, will precipitate out inside the tank.

Because of the importance in avoiding dirtying or contaminating the water the most convenient and primary storage containers have been difficult to clean while they contain a large amount of water. The large size of the water storage tank and the fear of disturbing sediments and deposits on the bottom and the walls of the tanks have made cleaning the interior of a water filled tank impractical. In the past those tanks had to be emptied before cleaning could be done. However, a method described in a recently described U.S. Pat. No. 4,571,271, discloses a method of sanitizing a diver and his diving apparatus so that a cleaning person can stay under water throughout the entire cleaning process without coming up for air. However, in that method the cleaning person or diver enters the tank at the very top, goes into the tank, after being thoroughly sanitized, cleans the spot or spots on the entire bottom with a suction pump or an air lift, the suction pump or air compressor is exterior of the tank and has a long hose, which extends over the top of the tank, down through the water to the bottom. These tanks can be anywhere from 50 to 100 feet more from the bottom to the top. This system works reasonable well, however, a tremendous amount of energy is used in lifting the sediments from the bottom of the tank out through the top.

SUMMARY OF THE INVENTION

This invention describes a process whereby an inlet/outlet is established in a water filled storage tank using an underwater diver without the necessity of draining the tank. After the inlet/outlet has been installed, a vacuum hose can be connected to a pump through this connection and the sediment cleared from the bottom of the tank. If the water lever is sufficiently high, hydrostatic pressure will eliminate the need of a pump.

I have a unique way of installing this inlet/outlet. Although it is quite convenient to locate this inlet/outlet through the manhole cover, other locations may be used. In preferred embodiment a diver places a dry pot over the spot in which the inlet/outlet is to be inserted. The dry pot is a cylindrical cup shaped object which has a flange with a gasket thereon at its open end and it fits the inner wall of the manhole cover. The other end of the dry pot has a valve opening. While the diver holds the dry pot opening against the manhole cover a person on the outside of the tank drills a hole through to the manhole cover. Once a hole is drilled, the water will hold the dry pot firmly against the manhole cover. I then insert a pipe nipple through the hole. On the outside of the nipple is a flange which I secure to the manhole cover. I can do this by either welding the complete periphery of the flange and making it water tight or I can make it water tight by use of a gasket and spot welding. The outer end of the pipe nipple is then provided with a cap or preferably a valve. The diver inside the water tank then lets the water into the dry pot with the valve at the back of the dry pot and the dry pot is removed. The diver can then, if desired, install a flange with gasket on the pipe nipple inside of the tank.

Other modifications of obtaining this inlet/outlet by use of a pipe nipple is disclosed. In one embodiment, after I drill a hole with the dry pot in place I place a bung into the hole, then the diver floods the dry pot and knocks the bung out. As soon as the bung is out, the diver inserts the pipe nipple through the hole. Flange and cap means are then applied.

In another embodiment the dry pot contains finger support supporting a nipple along the axis of the dry pot. The dry pot is positioned against the inside of the manhole cover, as described above, and the hole is then drilled. After the hole is drilled the person on the outside of the tank maneuvers the pipe nipple through the hole and appropriate flanges and valves and caps are then added. Then the dry pot is removed.

With this method I can transfer liquid from inside the tank to the outside of the tank. I can attach a suction hose through the pipe nipple for the purpose of removing sediments from inside the tank. I can also install a small inlet/outlet in the same manner and use it to supply air to a diver working inside of the tank. By using this system there is no need to waste the energy required to lift the sediments to the top of the tank and back down the side. This is a tremendous savings.

It is therefore an object of this invention to install an inlet/outlet in the wall of the liquid filled tank using an underwater diver without the necessity of draining or otherwise putting the tank out of service.

DESCRIPTION OF THE DRAWINGS

FIG. 3 is similar to FIG. 1 except in the method of inserting the pipe nipple is different.

FIG. 4 illustrates a bung in a hole in the tank manhole cover.

FIG. 5 illustrates the assembled inlet/outlet pipe nipple of FIG. 3.

DETAILED DESCRIPTION OF THE PREFERRED EMBODIMENT

Figure 1:
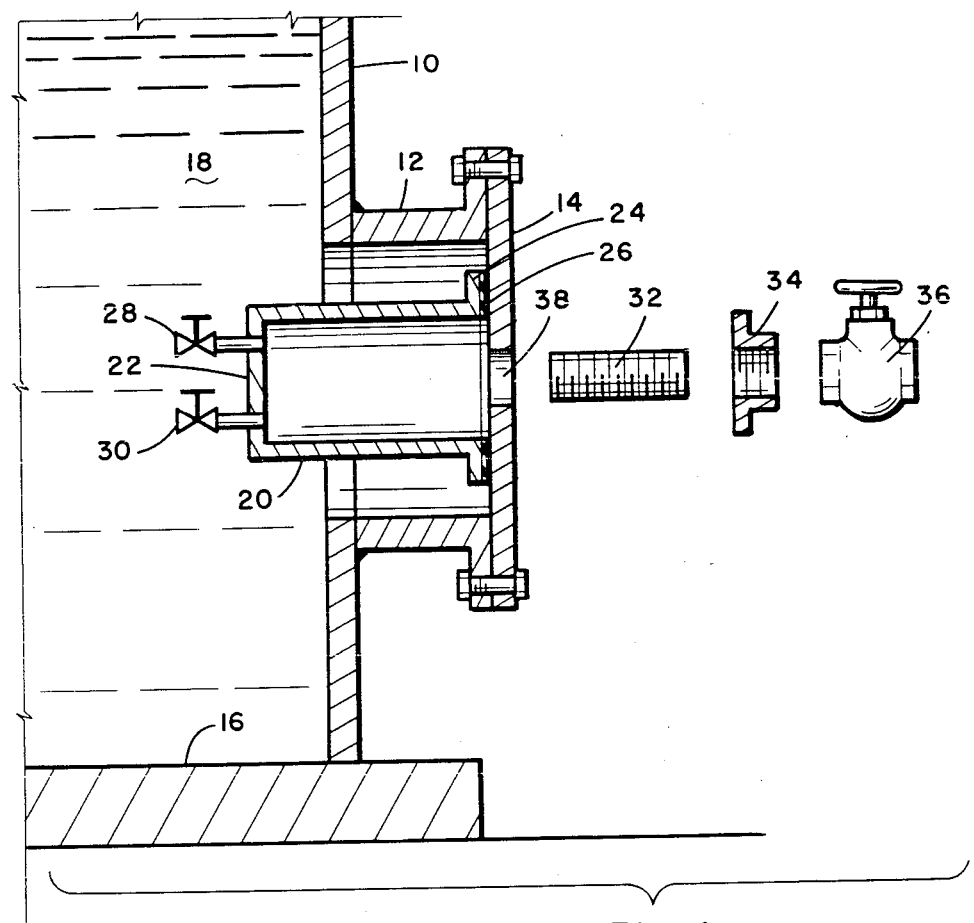
FIG. 1 illustrates a sectional view through a manhole in the wall of a water storage tank and associated equipment for installing a pipe nipple.

Attention is first directed to FIG. 1 which is mostly in section and shows a portion of a tank wall 10 and a bottom 16. Water 18 or other liquid is within the tank. This would most likely be a storage tank for water. A manhole 12 with cover 14 is provided in the wall 10 of the tank close to the bottom 16. It is quite common for water storage tanks to have a manhole which is located on the wall of the tank near the base. Shown adjacent the interior of the manhole cover 14 is a dry pot 20 which is basically a cylindrical shaped cup with a bottom 22, a flange 24, and gasket 26 on the flange. The bottom 22 is provided with valves 28 and 30.

Also shown in FIG. 1 is a pipe nipple 32 which has external threads and a flange 34 is secured to the nipple and the valve 36 is attachable to the end of the nipple.

I have just described the principal structural components required to carry out one embodiment of my invention. I will next describe the steps of one embodiment of the invention.

Figure 2:
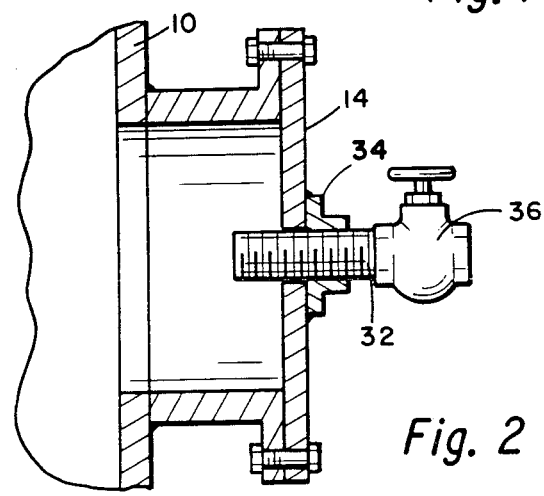
FIG. 2 is a view of the manhole cover of FIG. 1 with the inlet/outlet nipple installed.
Figure 7:
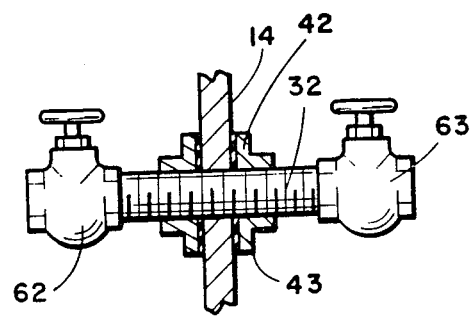
FIG. 7 shows the completed inlet/outlet after the pipe nipple shown in FIG. 6 is installed.

A diver enters the tank at the top through an opening not shown and takes with him the dry pot 20. The diver holds the dry pot, with valves, about centered on the back of the manhole cover. Other locations could be used but the backside of the manhole cover is essentially flat and is typically the preferred location. A person on the outside first drills a pilot hole at about the center of the manhole from the outside. As soon as the pilot hole has been drilled, the pressure of the liquid on the inside of the tank holds the dry pot in place. Now the hole is enlarged to have a hole 38 which is sufficient to accomodate the pipe nipple 32. The pipe nipple 32 is inserted through the hole 38 and flange 34 may then be welded to the outside face of the cover 14. The flange may be provided with a gasket and the flange itself only spot welded to the manhole cover and this will prevent leakage. If the gasket is eliminated a water-tight well can be made all the way around the flange 34 to the manhole cover. The flange 34 is also mounted on the pipe nozzle 32 in a manner so that there is no leakage between the flange and the pipe nipple. Next a valve 36 or cap is screwed onto the pipe nipple on the outside. I must remove the dry pot and in order to do this the diver on the inside of the tank opens the valves 28 and 30 so as to permit water to enter the dry pot. The dry pot is then removed and may be used in another tank. The diver may install a flange, with or without a gasket, on the pipe nipple inside of the tank and also the diver may screw a cap or valve onto the pipe nipple inside the tank as shown in FIGS. 5 and 7. FIG. 2 shows the pipe nipple 32, flange 34 and valve 36 installed in the manhole cover 14. The diver may desire to install a flange with gasket on the pipe nipple inside the tank and also screw a valve or cap onto the pipe nipple.

Attention is next directed to FIGS. 3, 4, and 5 which shows a slight variation in the method of assembling the inlet/outlet nipple 32. In this variation I place the dry pot 20 by a diver against the manhole cover 14 and then drill the holes large enough to accept the pipe nipple 32. At this point a bung 40, as shown in FIG. 4, is firmly secured in the hole 38 from the outside of the tank. Now the diver floods the dry pot 20 as above and removes it. With the pipe nipple in one hand on the inside of the tank and the flange 45 and gasket 46 in place on the pipe nipple the diver taps the bung 40 out of the hole using a hammer or other tool as needed. As soon as the bung is out the diver inserts the pipe nipple through the hole. The pipe nipple already has a cap or valve 48 on the interior side so once the nipple is inserted against the inner wall of the manhole cover 14 essentially all of the water flow is stopped. Then a person on the outside screws a flange 42 with gaskets 43 and valve 36 onto the nipple. The flanges are secured tightly so that the gaskets prevent any leakage. The inlet/outlet assembly is then completed as shown in FIG. 5.

Figure 6:
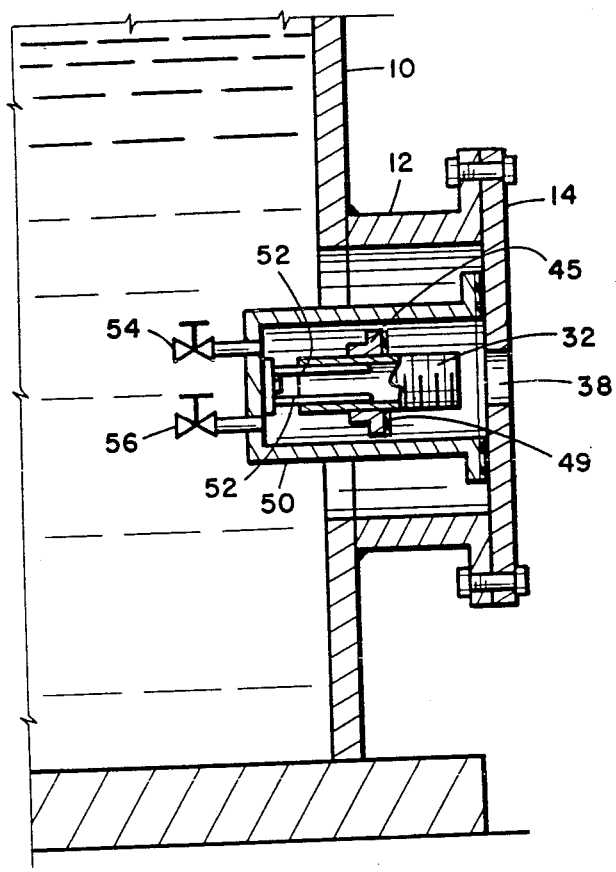
FIG. 6 is similar to FIG. 1 except that this is a modified dry pot.

For another variation in my method, attention is next directed to FIGS. 6 and 7. The dry pot 50 has been modified from that shown in FIGS. 1 and 3. The interior of the dry pot is provided with horizontally extending fingers 52. The nipple 32 with flange 45 attached is supported on these fingers 52. Dry pot 50 has valves 54 and 56. Dry pot 50 is positioned against the inside of the manhole cover 14 and hole 38 created in the same manner described above in regard to dry pot 20 in FIGS. 1 and 3. As shown in FIG. 6 the inner flange 46 is already in position on the pipe nipple 32 and is provided with a gasket 49. At this point, the person on the outside maneuvers the pipe nipple through the manhole cover. This person on the outside may use one or two rods which short right angles at one end to reach through to the inside of the pipe nipple to hook at the backend and maneuver it through the hole. Once the pipe nipple 32 is through the hole, gasket 43, flange 42 and cap or valve 63 are installed on the pipe nipple on the outside as shown. Now the diver floods the dry pot 50 as described above and removes it. The diver next puts a cap or valve 62 on the nipple inside of the tank. The inlet/outlet assembly is completed and is illustrated in FIG. 7.

After I have completed any of the above methods and obtained the assemblies as shown in FIGS. 2, 5, or 7 I am then ready to use this inlet/outlet. I can use this to attach a suction hose to the inlet/outlet for the purpose of removing sediments from the inside of the tank. This is a very efficient way of doing it. It requires much less energy as I do not have to expend energy in lifting the sediments out through the top of the tank. The larger the vertical dimension of the tank the greater the savings that my invention provides. If I desire I can also install a smaller inlet/outlet assembly in the manner just described. This smaller assembly can be used with a hose with an inside/outside supply of air for a diver working inside the tank.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of preparing a liquid storage tank for installing a tap valve though a hole in a selected area of the storage tank wherein the storage tank has a wall, a top and a bottom which comprise:

a housing means for isolating the selected on the inside of said storage tank near the bottom thereof so that the selected area is not in contact with the main body of liquid;

thereafter creating a hole in the wall thereof at the selected while said selected area is isolated and while liquid is in said tank at least to the depth of said location above the bottom;

placing a conduit through said hole;

placing a valve on said conduit and removing said housing means from the selected area from within the tank for cleaning said tank.

2. A method as defined in claim 1 including the additional step of connecting said conduit to a vacuum pump exterior of the tank and connecting a flexible conduit to said first conduit inside the tank and then vacuuming sediments off the bottom of the tank.

3. A method of installing a tap in a liquid storage tank containing liquid such as water and having a wall, a top and a bottom and a manhole cover in said wall, a method which comprises:

placing a dry pot having an open end with a flange and gasket means thereon against the inside of the manhole cover by manipulating the dry pot from within the tank while the tank contains liquid;

drilling a pilot hole at about the center of said manhole from the outside while said dry pot is held against said cover;

removing the water in the dry pot from the outside thus permitting the hydrostatic pressure within the tank to hold the dry pot in place when the hydrostatic pressure within the dry pot is reduced by removing the water therein;

placing a threaded pipe nipple with flange into the hole in said cover;

securing the flange of the pipe nipple to the manhole to prevent leakage between the flange and the hole;

screwing a threaded tap valve onto the threaded pipe nipple on the outside of the tank and removing the dry pot.

4. A method as defined in claim 3 in which said securing step includes making a water tight weld all the way around the periphery of the flange at its contact with the manhole cover.

5. A method as defined in claim 3 in which securing step includes a step of placing a gasket on the nipple flange and spot welding the flange to the face of the manhole cover.

6. A method of cleaning a liquid storage tank having water therein, a wall, a top, and a bottom which comprises the steps of:

placing a dry pot having an open end with a flange with a gasket thereon by manipulation from the inside to a selected location in the wall of said tank, drilling a hole in said location through the wall from the outside;

removing water from the dry pot through said holes for maintaining said dry pot at the selected location;

making said hole large enough to accomodate a pipe nipple with flange;

securing said pipe nipple with flange to said wall;

adding a valve onto said pipe nipple on the outside;

interjecting water into the dry pot and removing said dry pot from the selected location;

installing a flange with a gasket on the end of the pipe nipple inside the tank; and placing means for closing the end of the pipe nipple on the inside of the tank.

7. A method of cleaning a liquid storage tank having water therein a wall, a top and a bottom which comprises:

positioning a dry pot against the inside of the wall at a selected spot by manipulation from within the tank while the tank contains liquid to at least above the height of said spot;

drilling a hole through the wall of said tank at said spot while said dry pot is held against the inside of the tank;

firmly securing a bung to the hole from the outside of said tank;

permitting liquid to flow into said dry pot for removing the pot from the wall;

forcing the bung out of said hole and from the inside of said tank and inserting a pipe nipple with a flange through said hole until said flange engages the inside wall of the tank;

screwing a flange with a gasket onto the pipe nipple on the outside wall of the tank; and placing means on the nipple for closing an end of the nipple.

8. A method of tapping a liquid storage tank for cleaning in which the tank has a wall, a top, and a bottom which comprises:

placing a dry pot by a diver adjacent a spot on the wall inside of the tank at which a hole is to be drilled;

drilling a hole at said spot;

positioning a pipe nipple having a flange intermediate its ends in said dry pot and supporting it horizontally on means within said dry pot;

extending a tool from exterior of the tank through said hole and maneuvering the pipe nipple through the hole up to said flange along said support means;

placing a flange with a gasket onto the pipe nipple on the outside for sealingly securing the pipe nipple in said hole; and removing the dry pot after interjecting liquid from within the tank into said dry pot.

9. A method as defined in claim 8 including the first step of removing sediments from the bottom of said tank through said nipple.

10. A dry pot assembly useful for installing a tap valve through a hole in a tank for cleaning in which without removal of liquid from said tank the storage tank has a wall, a top, and a bottom which comprises:

a cylindrical housing having a longitudinal dimension and axis;

an outwardly extending flange on an open end of said housing for sealingly engaging a selected location within the tank;

a closed end on the other end of said housing;

fingers parallel to said axis extending inwardly from said closed end for supporting a pipe nipple thereon, said fingers and said pipe nipple being completely within said housing; and at least one passage through said closed end with a valve thereon.

* * * * *